July 28, 1925.

W. MARTIN

MOLD FOR CHIMNEYS AND GLOBES

Filed Jan. 30, 1924

1,547,933

2 Sheets-Sheet 1

Warren Martin
INVENTOR

BY Victor J. Evans
ATTORNEY

July 28, 1925.  1,547,933
W. MARTIN
MOLD FOR CHIMNEYS AND GLOBES
Filed Jan. 30, 1924   2 Sheets-Sheet 2

Warren Martin
INVENTOR
BY Victor J. Evans
ATTORNEY

Patented July 28, 1925.

1,547,933

UNITED STATES PATENT OFFICE.

WARREN MARTIN, OF STAR CITY, WEST VIRGINIA.

MOLD FOR CHIMNEYS AND GLOBES.

Application filed January 30, 1924. Serial No. 689,478.

*To all whom it may concern:*

Be it known that I, WARREN MARTIN, a citizen of the United States, residing at Star City, in the county of Monongalia and State of West Virginia, have invented new and useful Improvements in Molds for Chimneys and Globes, of which the following is a specification.

The object of this invention is to provide an improved form of mold especially intended for blowing lamp chimneys, but also adapted with slight modification for blowing globes for gas and electric fixtures.

A further object is to provide a device of this type which shall include an upper mold section for the top of the chimney, a mold section for the neck of the chimney, a press blank mold for use in the first stage of the operation wherein the chimney top and neck are formed by the operation of a plunger, and a paste mold section for the bowl and heel of the chimney, this mold section last named being substituted for the press blank mold, after which the revolving nozzle of the blow pipe is inserted for forming the bowl and heel portions of the chimney.

With the foregoing and other objects in view, the invention consists in the novel construction and arrangement of elements described, illustrated and claimed, it being understood that modifications may be made within the scope of the claims, without departing from the spirit of the invention.

Figure 1:
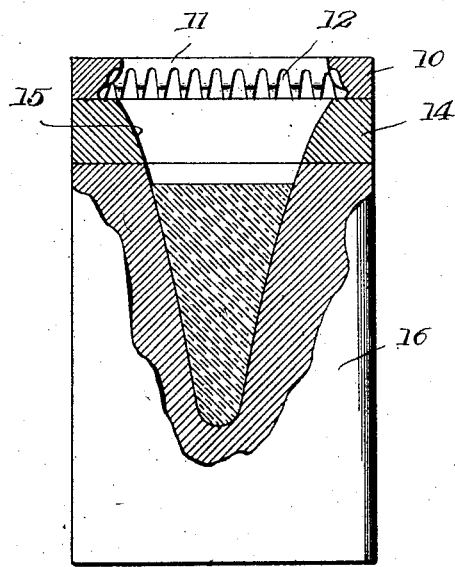
Figure 2:
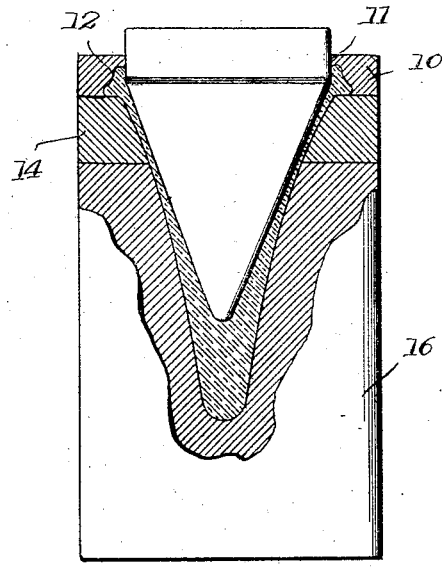
Figure 6:
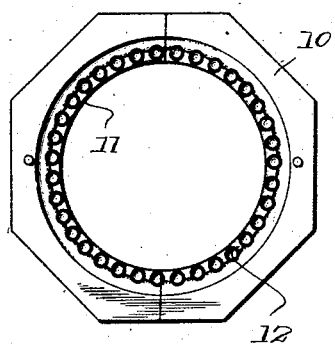
Figure 7:
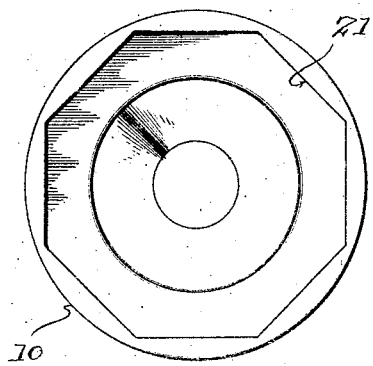
Figure 3:
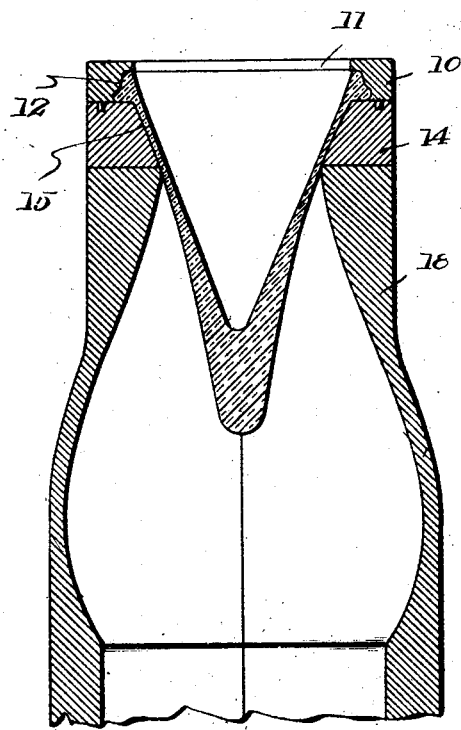
Figure 4:
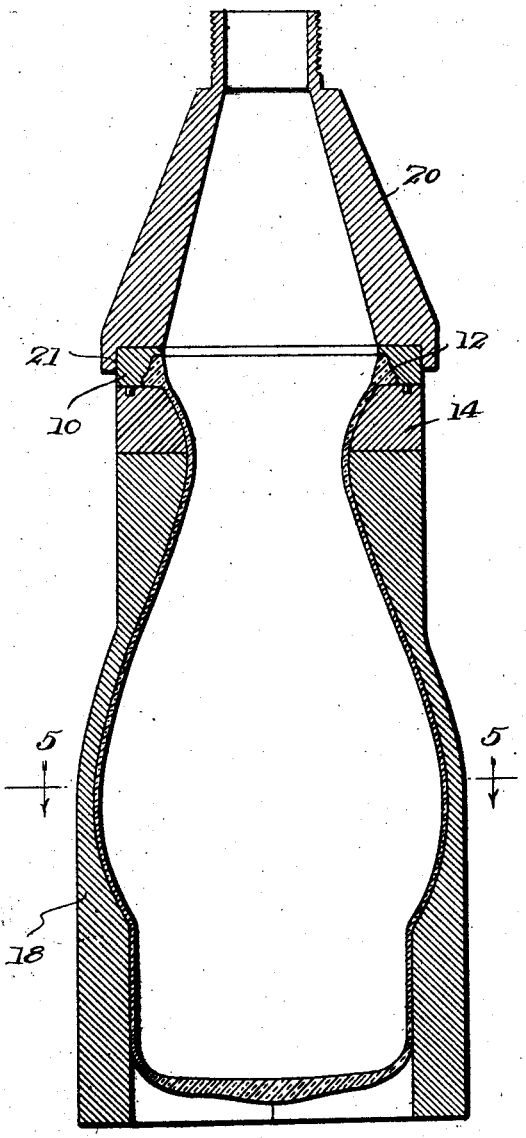
Figure 5:
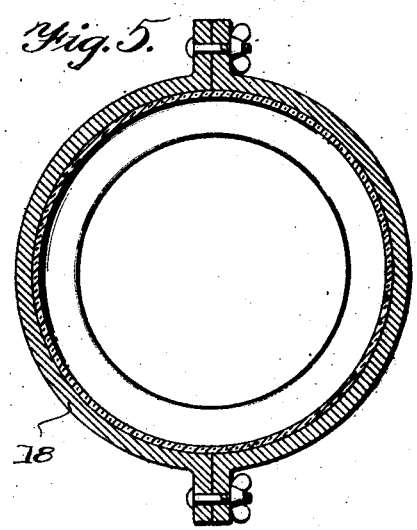

In the drawings, Figure 1 shows a press blank mold in elevation, with portions, including the upper mold members, in vertical section; Figure 2 is a similar view, with the addition of a plunger for forming the upper part of a chimney; Figure 3 shows a portion of a paste mold and the upper mold members, in vertical section, the partly formed chimney having been transferred to this mold; Figure 4 is a vertical section through a blow pipe nozzle, the upper mold sections and the paste mold; Figure 5 is a section on line 5—5 of Figure 4; Figure 6 is a bottom plan view of the upper mold section, having angular sides or edges; Figure 7 is a bottom plan view of the blow pipe nozzle, the upper mold section of Figure 6 being proportioned to fit within the end of the nozzle.

The upper mold section consists of an iron ring 10 of octagonal form and having an inner opening 11 and an inner fluted or crimped edge portion 12, for forming the chimney top.

Ring 10 is carried by mold section 14 for forming the neck of the chimney, and having a central opening formed with a wall 15 of the form illustrated.

In the first stage of the operation, elements 10 and 14 are carried by the press blank mold 16, and the latter is partly filled with hot glass and the whole placed in a press. When the plunger of the press moves downwardly into the mold and body of glass therein, the top and neck portions of the chimney will be pressed into shape. A paste mold 18 is then substituted for element 16 by lifting off mold sections 10 and 14 with the hot glass, and placing the whole on mold 18 for forming the bowl and heel of the chimney by means of a blow pipe.

A revolving nozzle of a blow pipe is designated 20, and is formed with an octagonal end portion 21 proportioned to engage the octagonal mold section 10, and rotate mold sections 10 and 14 while the paste mold 18 remains stationary. The blowing operation is then effected by compressed air by the use of apparatus usually employed for the purpose.

What I claim is:

1. In a device of the class described, an upper mold section for the top of a chimney or the like, said section including vertical flat sides forming angular portions proportioned for non-rotatable engagement by a blow pipe nozzle, a mold section for the neck of the chimney, and a mold for the bowl and heel of the chimney.

2. In a device of the class described, an upper mold section for the top of a chimney or the like, a mold section for the neck of the chimney, a revolving blow pipe nozzle connected with the upper mold section, and a stationary mold section having walls continuous with the inner wall of the second named mold section, for use when blowing the bowl and heel portions of the chimney, and proportioned to form said bowl and heel.

In testimony whereof I affix my signature.

WARREN MARTIN.